(12) United States Patent
Messing et al.

(10) Patent No.: US 7,110,012 B2
(45) Date of Patent: *Sep. 19, 2006

(54) SYSTEM FOR IMPROVING DISPLAY RESOLUTION

(75) Inventors: Dean Messing, Camas, WA (US); Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 384 days.

This patent is subject to a terminal disclaimer.

(21) Appl. No.: 10/447,186

(22) Filed: May 27, 2003

(65) Prior Publication Data

US 2004/0061710 A1    Apr. 1, 2004

Related U.S. Application Data

(63) Continuation of application No. 09/735,424, filed on Dec. 12, 2000, now Pat. No. 6,608,632, which is a continuation of application No. 09/735,425, filed on Dec. 12, 2000, now Pat. No. 6,807,319, which is a continuation of application No. 09/735,454, filed on Dec. 12, 2000, now Pat. No. 6,775,420.

(60) Provisional application No. 60/469,432, filed on May 9, 2003, provisional application No. 60/441,582, filed on Jan. 21, 2003, provisional application No. 60/211,020, filed on Jun. 12, 2000.

(51) Int. Cl.
*G09G 5/02* (2006.01)

(52) U.S. Cl. ..................... 345/698; 345/611
(58) Field of Classification Search .............. 345/690, 345/698, 603, 604, 611, 616; 382/263, 275, 382/254; 348/450
See application file for complete search history.

(56) References Cited

U.S. PATENT DOCUMENTS

| 5,528,740 | A | * | 6/1996 | Hill et al. | 345/428 |
| 6,608,632 | B1 | * | 8/2003 | Daly et al. | 345/698 |
| 6,775,420 | B1 | * | 8/2004 | Daly | 382/275 |
| 6,807,319 | B1 | * | 10/2004 | Kovvuri et al. | 382/275 |
| 2004/0264798 | A1 | * | 12/2004 | Daly | 382/263 |

* cited by examiner

*Primary Examiner*—Ricardo Osorio
(74) *Attorney, Agent, or Firm*—Chernoff, Vilhauer, McClung & Stenzel

(57) ABSTRACT

A system for improving the display resolution by the reduction of chromatic aliasing.

29 Claims, 12 Drawing Sheets

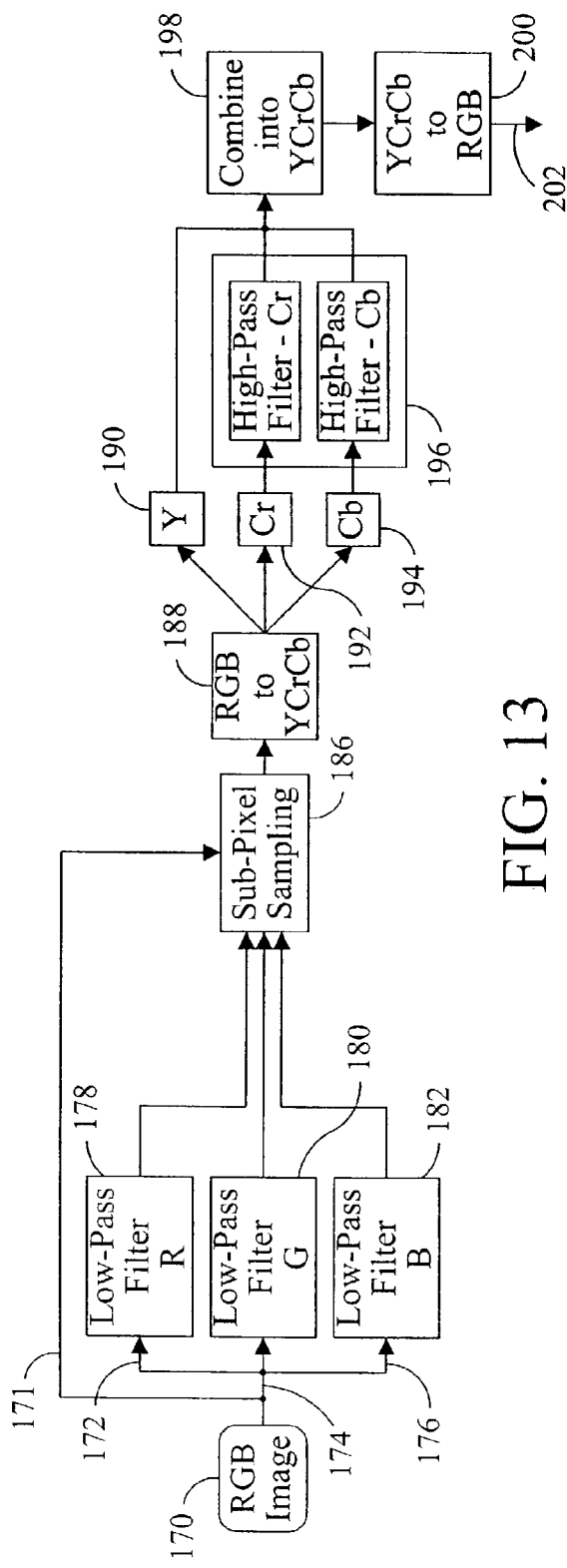
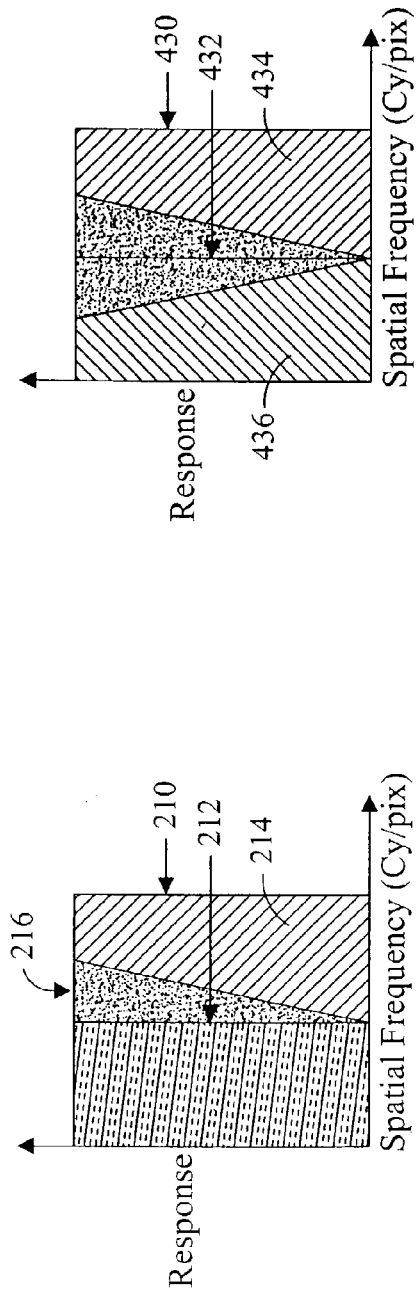
FIG. 13
FIG. 14
FIG. 15

SYSTEM FOR IMPROVING DISPLAY RESOLUTION

The present applications claims the benefit of U.S. patent application filed May 9, 2003, U.S. Ser. No. 60/469,432 entitled System For Improving Display Resolution; which is a continuation of U.S. patent application Ser. No. 09/735,424 filed Dec. 12, 2000 which claims the benefit of 60/211,020 filed Jun. 12, 2000; which is a continuation of U.S. patent application Ser. No. 09/735,425 filed Dec. 12, 2000 which claims the benefit of 60/211,020 filed Jun. 12, 2000; which is a continuation of U.S. patent application Ser. No. 09/735,454 filed Dec. 12, 2000 which claims the benefit of 60/211,020 filed Jun. 12, 2000.

This present application also claims the benefit of U.S. Patent Application U.S. Ser. No. 60/441,582 entitled SUB-PIXEL RENDERING ON NON-STRIPED COLOUR MATRIX DISPLAYS, filed Jan. 21, 2003.

BACKGROUND

The present invention relates to the field of displaying high resolution images on displays with lower resolution.

The most commonly used method for displaying high-resolution images on a lower resolution color mosaic display is to prefilter and re-sample the pixels 2 of the high-resolution image 4 down to the resolution of the low-resolution display 6, as shown in FIG. 1. In the process, the R, G, B values of selected color pixels 8 are mapped to the separate R, G, B elements 10, 12 and 14 of each display pixel 16. These R, G, B elements 10, 12 and 14 of a display pixel are sometimes also referred to as subpixels. Because the display device does not allow overlapping color elements, the subpixels can only take on one of the three R, G, or B colors. The color's amplitude, however, can be varied throughout the entire grey scale range (e.g., 0–255). The subpixels often have a 1:3 aspect ratio (width:height), so that the resulting pixel 16 is square. The aforementioned sub-sampling/mapping techniques fail to consider the fact that the display's R, G, and B subpixels are spatially displaced; in fact the pixels of the low resolution image are assumed to be overlapping in the same manner as they are in the high-resolution image. This type of sampling may be referred to as sub-sampling, traditional sub-sampling, or ordinary sub-sampling.

The pixels of the high-resolution image 4 are shown as three slightly offset stacked squares 8 to indicate their RGB values are associated for the same spatial position (i.e., pixel), generally referred to as co-sited sub-pixels. One display pixel 16 on a color mosaic display, consisting of one each of the R, G and B subpixels 10, 12 and 14 is shown as part of the lower-resolution triad display 6 in FIG. 1.

In the example shown in FIG. 1, the high-resolution image has 3× more resolution than the display (in both horizontal and vertical dimensions). In the case that filtering is omitted, the subsampling process would cause undesirable aliasing artifacts, and, accordingly, various methods are used, such as averaging the neighboring un-sampled pixels in with the sampled pixel, to reduce the aliasing. In addition, the subsampling technique of FIG. 1 results in mis-registration of the color fields each of which carries a portion of the luminance information. This leads to a loss of luminance resolution attainable at the sub-pixel sampling rate.

It is noted that the technique of weighted averaging of neighboring elements while subsampling is mathematically equivalent to prefiltering the high resolution image. Also, it is noted that techniques of selecting a different pixel than the leftmost (as shown in FIG. 1) can be considered as a prefiltering that affects only phase. Thus, most of the processing associated with reducing aliasing may be viewed as a filtering operation on the high-resolution image, even if the kernel is applied only at the sampled pixel positions, or both.

It has been realized that the aforementioned techniques do not take advantage of potential display resolution. Information regarding potential display resolution is discussed by R. Fiegenblatt (1989), "Full color imaging on amplitude color mosaic displays" Proc. SPIE V. 1075, 199–205; and J. Kranz and L. Silverstein (1990) "Color matrix display image quality: The effects of luminance and spatial sampling," SID Symp. Digest 29–32, incorporated herein by reference.

For example, in the display shown in FIG. 1, while the display pixel 16 resolution is ⅓ that of the pixel resolution of the high resolution image (source image) 4, the subpixels 10, 12 and 14 of the low resolution image are at a resolution equal to that of the high resolution image (in the horizontal dimension). This may be taken advantage of as shown in FIG. 2. In the case that the low resolution display were to be viewed solely by a color blind individual, he would see it as a higher resolution image than if ordinary sub-sampling is used. In essence, a luminance value exists for each pixel of the high resolution image which is mapped to a corresponding sub-pixel of the low resolution image. In this manner, a portion of the high resolution luminance image 4 is preserved in the sub-pixels of the low resolution image. This approach is shown in FIG. 2, where the R, G, and B subpixels 10, 12 and 14 of the low resolution display are taken from the corresponding colors of different pixels 11, 13 and 15 of the high-resolution image. This allows the sub-pixel horizontal resolution of the low resolution display to be at the pixel resolution of the high resolution display. Sampling which comprises mapping of color elements from different image pixels to the subpixels of a display pixel triad may be referred to as sub-pixel sampling.

But what about the viewer of the display who is not color-blind? That is, the majority of viewers. Fortunately for display engineers, even observers with perfect color vision are generally color blind at the highest spatial frequencies. This is indicated in FIG. 3, where idealized spatial frequency responses of the human visual system are shown.

In FIG. 3, luminance Contrast Sensitivity Function (CSF) 17 refers to the achromatic content of the viewed image, and chrominance CSF 19 refers to the color content, which is processed by the visual system as isoluminant modulations from red to green, and from blue to yellow. The color difference signals R-Y and B-Y of typical video are rough approximations to these modulations. For most observers, the bandwidth of the chromatic frequency response is ½ that of the luminance frequency response. Sometimes, the bandwidth of the blue-yellow modulation response is even less, down to about ⅓ of the luminance.

With reference to FIG. 4, in the horizontal direction of the display, there is a range of frequencies that lie between the Nyquist frequency of the display pixels 16 (display pixel=triad pixel, giving a triad Nyquist at 0.5 cycles per triad pixel) and the Nyquist frequency of the sub-pixels 10, 12 and 14 (0.5 cycles per subpixel=1.5 cycles/triad pixels). This region of frequencies is shown as the rectangular region 20 in FIG. 4. The result of convolving the high resolution image with a rect function whose width is equal to the display sample spacing is shown as a dashed-dot curve 22. This is the most common approach taken for modeling the display MTF (modulation transfer function) when the display is a LCD.

The result of convolving the high-res source image with a rect function whose width is equal to the subpixel spacing is shown as a dashed curve 24, which has higher bandwidth. This is the limit imposed by the display considering that the subpixels are rect in ID. In the shown rectangular region 20, the subpixels can display luminance information, but not chromatic information. In fact, any chromatic information in this region is aliased. Thus, in this region, by allowing chromatic aliasing, the display may achieve higher frequency luminance information than allowed by the triad (i.e., display) pixels. This is the "advantage" region afforded by using sub-pixel sampling.

The sub-pixel sampling registers the luminance information in the three color fields of the displayed image. Misregistration as a result of displaying the image causes loss of luminance resolution while sub-pixel sub-sampling reduces it. The sub-sampling prefilter applied to the image may be sufficiently broad to permit the high resolution luminance information to pass. This additional luminance resolution will not result in significant aliasing of the luminance information because the Nyquist frequency is determined by the sub-pixel sampling period. However, significant chromatic aliasing can occur because the chromatic Nyquist frequency is determined by the display sampling period. The "advantage" region may be thought of as where significant chromatic aliasing occurs and significant luminance aliasing does not occur.

For applications with font display, the black and white fonts are typically preprocessed, as shown in FIG. 5. The standard pre-processing includes hinting, which refers to the centering of the font strokes on the center of the pixel, i.e., a font-stroke specific phase shift. This is usually followed by low-pass filtering, also referred to as grey scale anti-aliasing.

The visual frequency responses (CSFs) shown in FIG. 3 are idealized. In practice, they have a finite falloff slope, more representatively shown in FIG. 6A. The luminance CSF 30 has been mapped from units of cy/deg to the display pixel domain (assuming a viewing distance of 1280 pixels). It is shown as the solid line 30 that has a maximum frequency near 1.5 cy/pixel (display pixel), and is bandpass in shape with a peak near 0.2 cy/pixel triad. The R:G CSF 32 is shown as the dashed line, that is lowpass with a maximum frequency near 0.5 cy/pixel. The B:Y CSF 34 is shown as the long dashed LPF curve with a maximum frequency similar to the R:G CSF, but with lower peak response. The range between the cutoff frequencies of the chroma CSF 32 and 34 and the luminance CSF 30 is the region where one may allow chromatic aliasing in order to improve luminance resolution. The chromatic aliasing will not be visible to the human eye because it falls outside the chromance CSF.

FIG. 6A also shows an idealized image power spectra 36 as a 1/f function, appearing in the figure as a straight line with a slope of −1 (since the figure is using log axes). This spectrum will repeat at the sampling frequency. The pixel repeat 38 is due to the pixel sampling rate, and the repeat 40 is due to the subpixel sampling rate. Note that the shapes of the repeat spectra are different than the 1/f base band spectra 36, because they are plotted on log-log axes. The portions of these repeat spectra 38 and 40 that extend below their respective Nyquist frequencies represent aliasing. The leftmost one is chromatic aliasing 38 since it is due to the pixel sampling rate, while the luminance aliasing 40 occurs at higher frequencies because it is related to the higher sub-pixel sampling rate.

In FIG. 6A, no prefiltering has been applied to the source spectra. Consequently, aliasing, due to the pixel sampling (i.e., chromatic aliasing), extends to very low frequencies 35. Thus even though the chromatic CSF has a lower bandwidth than the luminance CSF, the color artifacts will, in general, still be visible (depending on the noise and contrast of the display).

In FIG. 6B, a prefilter was applied (a rect function in the spatial domain equal to three source image pixels), shown in FIG. 4 as a dashed-dotted line 22, to the source power spectrum, and it affects the baseband spectrum 42 in the region of 0.5 cy/pixel and greater, causing it to have a slope steeper than −1 shown at 44. The steeper slope effectively reduces the effects of the chromatic aliasing. The repeat spectra 38a and 40a also show the effect of this prefilter. For example, the tail 35 (FIG. 6A) is dramatically reduced as tail 46 (FIG. 6B) with this filter. The visible chromatic aliasing, that is aliasing under the two chrominance CSFs 32a and 34a, is reduced. However, it can be observed that this simple luminance prefiltering also removes significant luminance resolution (e.g. the curve 44 (FIG. 6B) relative to curve 45 (FIG. 6A)).

To increase the luminance information a system may use the difference in the human visual system's luminance and chrominance bandwidth. This bandwidth difference in luminance and chrominance (CFSs) in FIG. 6B may be referred to as the "advantage region". One technique to achieve such a boost is to design the prefiltering based on visual system models as described in C. Betrisey, et al (2000), "Displaced filtering for patterned displays," SID Symposium digest, 296–299, incorporated by reference and illustrated in FIG. 7.

The Betrisey, et al. technique ideally uses different prefilters depending on which color layer, and on which color subpixel the image is being sampled for. There are 9 filters designed using a human visual differences model described in Zhang and B. Wandell (1996) "A spatial extension of CIELAB for digital color image reproduction," SID Symp. Digest 731–734, incorporated herein by reference and shown in FIG. 7. This was done offline, assuming the image is always black and white. In the final implementation, three rect functions rather than the resulting nine optimal filters are used in order to save computations. In addition, there is still some residual chromatic error that can be seen because the chromatic aliasing extends down to lower frequencies than the chromatic CSF cutoff (as seen in FIG. 6B).

BRIEF DESCRIPTION OF THE DRAWINGS

It is to be understood that these drawings depict only typical embodiments of the invention and are not therefore to be considered to be limiting of its scope. The invention will be described and explained with additional specificity and detail through the use of the accompanying drawings in which:

FIG. 13 is another block diagram of another embodiment.

FIG. 14 illustrates a spatial frequency response.

FIG. 15 illustrates another spatial frequency response.

DETAILED DESCRIPTION OF THE PREFERRED EMBODIMENTS

The preferred embodiments are best understood by reference to the drawings, wherein like parts are designated by like numerals throughout. The figures listed above are expressly incorporated as part of this detailed description.

Elements of the system may be embodied in hardware, firmware and/or software. While exemplary embodiments revealed herein may only describe one of these forms, it is to be understood that one skilled in the art would be able to effectuate these elements in any of these forms.

It is readily understood that the components, as generally described and illustrated in the figures herein, may be arranged and designed in a wide variety of different configurations. Thus, the following more detailed description of the embodiments is not intended to limit the scope of the invention but it is merely representative of the embodiments.

An achromatic image, may be defined as an image having no readily visible color variation. This achromatic condition may occur when an image contains identical multiple layers or color channels thereby yielding a gray-scale image.

Embodiments may be described with reference to "RGB" images or domains, or "additive color domains", or "additive color images." These terms refer to any form of multiple component image domain with integrated luminance and chrominance information, including, but not limited to, RGB domains.

Embodiments may also be described with reference to "YCbCr" images or domains, "opponent color" domains, images or channels, or "color difference" domains or images. These terms refer to any form of multiple component image domain with channels which comprise distinct luminance channels and chrominance channels including, but not limited to, YCbCr, LAB, YUV, and YIQ domains.

Figure 8:
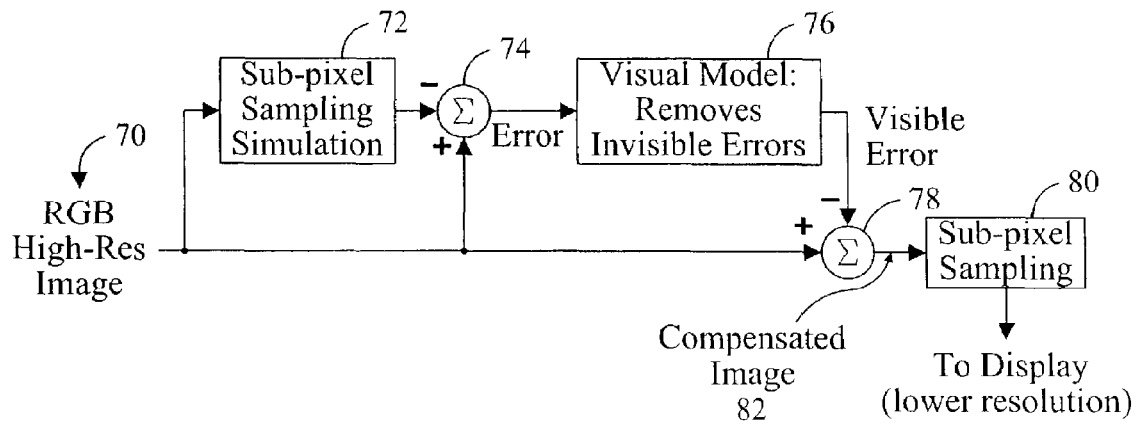
FIG. 8 is a block diagram showing one embodiment of the present invention.

Some embodiments are summarized in the block diagram shown in FIG. 8 wherein a high-resolution image, such as RGB high-resolution image 70, is modified. Unlike some known methods, the process is preferably not carried out solely in the RGB domain, although it could be. The YCrCb color domain may also be used, wherein the luminance and the chromatic components (Red-Green and Blue-Yellow) are separated. Any domain may be used, such as for example, approximations to the visual systems opponent color channels. Examples include CIELAB, YUV, and Y R-Y B-Y. Also, color domains where one or more channels have an enhanced luminance component with respect to the other channels may likewise be used. One potential measure of such enhancements is if a channel has >60%, >70%, >80%, >90%, or >95% of the luminance. In addition, the enhanced luminance color domain may be as a result of implicit processing in another color domain as opposed to a traditional color transformation from one color space to another. The luminance component is normally used for the detail. The chromatic components are modified so that after the sum 78 the compensated image 82 has false low frequencies that are of inverse sign to those that will be generated in sub-pixel sampling step 80, thus canceling in the final image sent to the display. Accordingly, low chromatic frequencies (i.e. the visible ones) are attenuated and high chromatic frequencies remain (i.e. the invisible one), eventually yielding a better sub-pixel sampled image that has fewer visible chromatic artifacts.

The system is described with respect to non-overlapping pixels, or otherwise spatially discrete color sub-pixels (e.g. color mosaic displays). However, the embodiments described herein may likewise be used with colors that are overlapping to a greater or lesser degree. Moreover, the images may be displayed using different sizes of pixels. In addition, while the preferred embodiments are described with respect to rectangular pixels and subpixels, other shapes of pixels and subpixels may likewise be used. Also, any particular pixel may be formed by a plurality of sub-pixels in any arrangement, some of which may be duplicated.

The system may be used to modify images which have been pre-filtered or which exist in a format or condition which does not require filtering, such as low-pass filtering. These particular embodiments may bypass any RGB pre-filtering steps and begin by processing an image with sub-pixel sampling.

Referring to FIG. 8 the high-resolution image may be defined in a manner such that the high-resolution image relative to a low-resolution image has more information content for a given portion of the image than the low-resolution image. The conversion process may be generally referred to as re-sampling. In some cases the low and high resolution images may be displayed on the same monitor, the same pixel spatial density, different sized monitors with the same number of pixels, etc. The high-resolution image 70 is sampled in a sub-pixel sampling simulation 72 to simulate the visible error caused by sub-pixel sampling. Since the sampling is preferably simulated, the resolution (i.e. the number of pixels) does not have to change, if desired. The error may be ascertained by comparing the original image 70 with the sub-pixel sampling simulation 72. The error may be isolated by subtracting 74, the simulation 72 from the original image 70. A visual model 76 may be used to reduce undesirable information, such as color aliasing. The result of the visual model may be used to modify the original image 70, for example, by introducing information representative of the visible error that is desirable to reduce in subsequent sub-pixel sampling. A modified error image is representative of the visible error, which is reduced during subsequent sub-pixel sampling. This modified error image is subtracted from the original image 70, and the result may be referred to as the compensated image 82 and is not limited to the 0–255 R, G, B range of the source image 70, as it allows for the use of negative values, if desired. For example, the compensated image may have a greater range of colors or be represented in a different manner.

The compensated image 82 is modified to remove additional information that is introduced, during the subsequent sub-pixel sampling 80. The compensated image 82 is then sampled using the sub-pixel sampling process 80 wherein the additional added information is reduced as a result of the sub-sampling process resulting in an improved lower-resolution image.

Accordingly, at least a portion of the visible error that is caused as a result of sub-pixel sampling is simulated and then identified in the high-resolution source image (or an image derived therefrom). The simulation of the visible error is preferably maintained at the same resolution as the higher resolution source image to simplify complexity. The visible error is preferably subtracted from the RGB image to create the compensated image 82. Accordingly, when such a corresponding visible error is introduced by the subpixel sampling process 80, it is reduced, at least in part, in the final image.

The system shown in FIG. 8 reduces the chromatic aliasing occurring at the lower frequencies as a result of sub-sampling. Accordingly, chromatic aliasing frequencies that are originally so high that they fold over at the Nyquist frequency to very low frequencies, that would otherwise be highly visible, are reduced.

The visual model 76 may take a different form than the known model used in the Betrisey approach. In known models, such as Betrisey, the visual model is a difference measure where two images are input and the output is an image indicating where visual differences occur. In the Betrisey approach, this image of visible differences is integrated in a squared form to arrive at a single number measure. These known models are described in X. Zhang and B Wandell (1996), "A spatial extension of CIELAB for digital color image reproduction, SID Symposium Digest 731–734; C. Betrisey, et al. (2000), "Displaced filtering for patterned displays," SID Symposium Digest, 296–299; and S. Daly (1993), "Visible Differences Predictor," Ch. 14 of Digital Images and Human Vision, ed. by A. B. Watson, MIT Press. These references are incorporated herein by reference.

In one embodiment, the visual model 76 removes or otherwise reduces the visibility of image content that is generally not visible or otherwise of limited visibility to the eye. Consequently, the visual model does not necessarily need to compute the visible difference between images, but rather may act on a single image. In alternative embodiments, the embodiments may be extended to operate upon multiple images, which achieving similar results in luminance resolution and the reduction of chromatic aliasing. One way to achieve this result is to filter the image by the appropriate CSFs and core by the threshold. In FIG. 8, the visual model 76 is shown in generic form.

Figure 9:
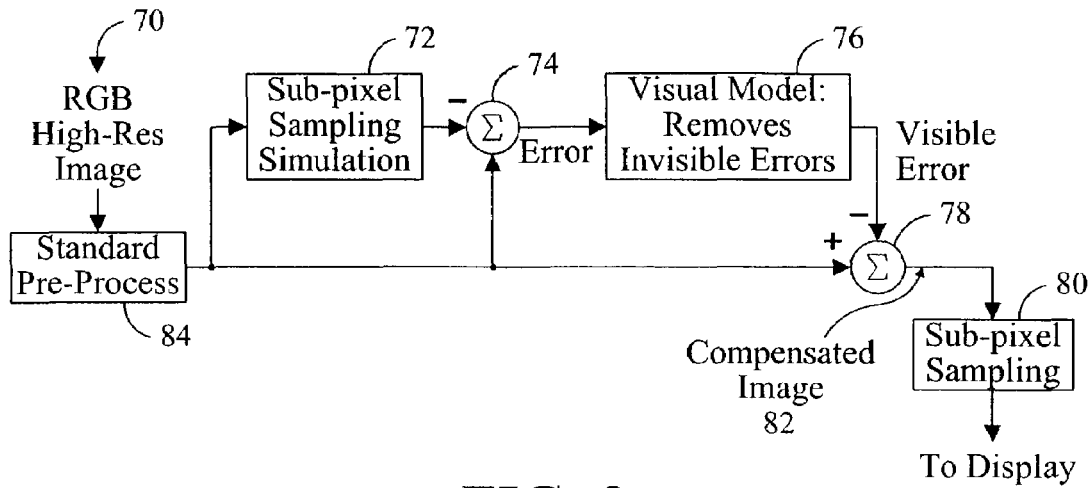
FIG. 9 is a block diagram showing another embodiment of the present invention which employs pre-processing.

In reference to FIG. 9, the system may be used in conjunction with standard pre-process methods 84, such as the more traditional techniques of hinting and low-pass filtering. Once standard pre-processing methods 84 are performed, the image is treated in the same manner as those without pre-process techniques. That is, the high-resolution image 70 is pre-processed 84 followed by sampling in a sub-pixel sampling simulation 72 to simulate the error caused by sub-pixel sampling. The error may be isolated by subtracting 74 the simulation 72 from the original image. A visual model 76, then reduces non-detectable information from the error image creating a modified error image which represents the visible error. The compensated image is then obtained by adding to the original image 70 the visible error that will be reduced during actual sub-pixel sampling 80. The compensated image 82 is sampled using a sub-pixel sampling process 80 wherein the subtracted visible error is reduced, or otherwise removed, as a result of the sub-pixel sampling process.

Figure 10:
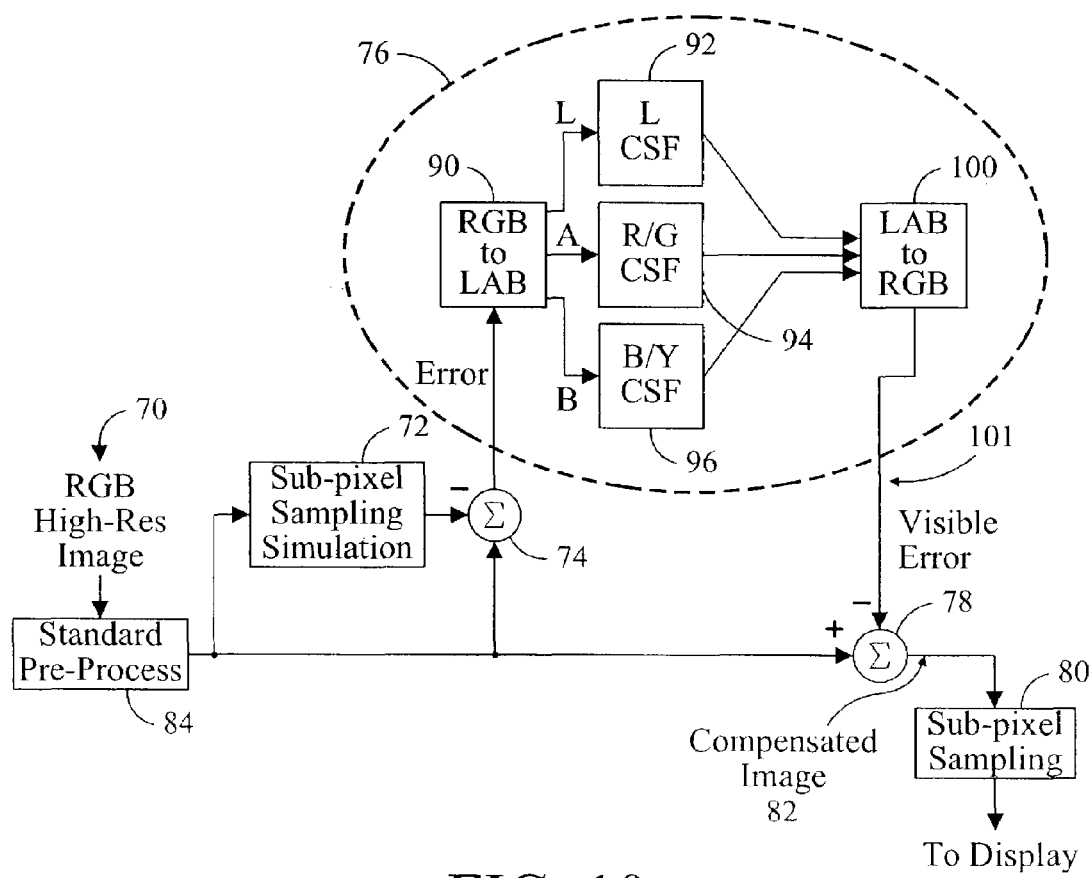
FIG. 10 is a block diagram showing yet another embodiment of the present invention which uses filtering of separated luminance and chrominance channels.

The visual model 76 may be used in conjunction with different embodiments described herein. Referring to FIG. 10, image 70 may be pre-processed 84 if desired by a user or processed directly without pre-processing. The image 70 is processed by the sub-pixel sampling simulation 72 to determine the error associated with sub-pixel sampling. The simulated image is then subtracted 74 from original image 70 to produce an error image which is processed through the visual model 76. In this embodiment, the visual model 76 comprises a conversion 90 from RGB to LAB. This conversion 90 results in an image expressed in three channels which isolates (to some degree) the luminance characteristics from chromatic characteristics. While several color models may be used, the CIELAB model is exemplary and an equivalent model is preferred in this embodiment. Another embodiment using linear Y, R-Y, and B-Y signals may likewise be used. In many cases, a conversion to a color space (or otherwise calculations) that enhances the luminance information in one or more channels in relation to the chromatic information, is desirable.

Once the simulated error image has been converted, the luminance channel 92 and the chrominance channels 94 and 96 are filtered to remove the generally non-visible errors from the error image. Preferably, these filtering operations comprise filtering and a spatial coring operation to remove localized frequencies whose amplitudes are too small to be effectively observed. Different filters may be used for each channel while some channels may not be filtered as desired for specific applications. Typically, the luminance channel 92 and each chrominance channel 94 and 96 are filtered using different filters. This LAB visible error image is subsequently re-converted 100 back to a RGB format visible error image 101. The RGB visible error image 101 is then subtracted from 78 the original image 70 to form a compensated image 82 which compensates for errors introduced through sub-pixel sampling. This compensated image 82 is then sampled using sub-pixel sampling 80 wherein the added visible error compensation 101 is canceled in the sampling process yielding a lower-resolution image with fewer chromatic artifacts than one created through simple sub-pixel sampling alone.

Figure 11:
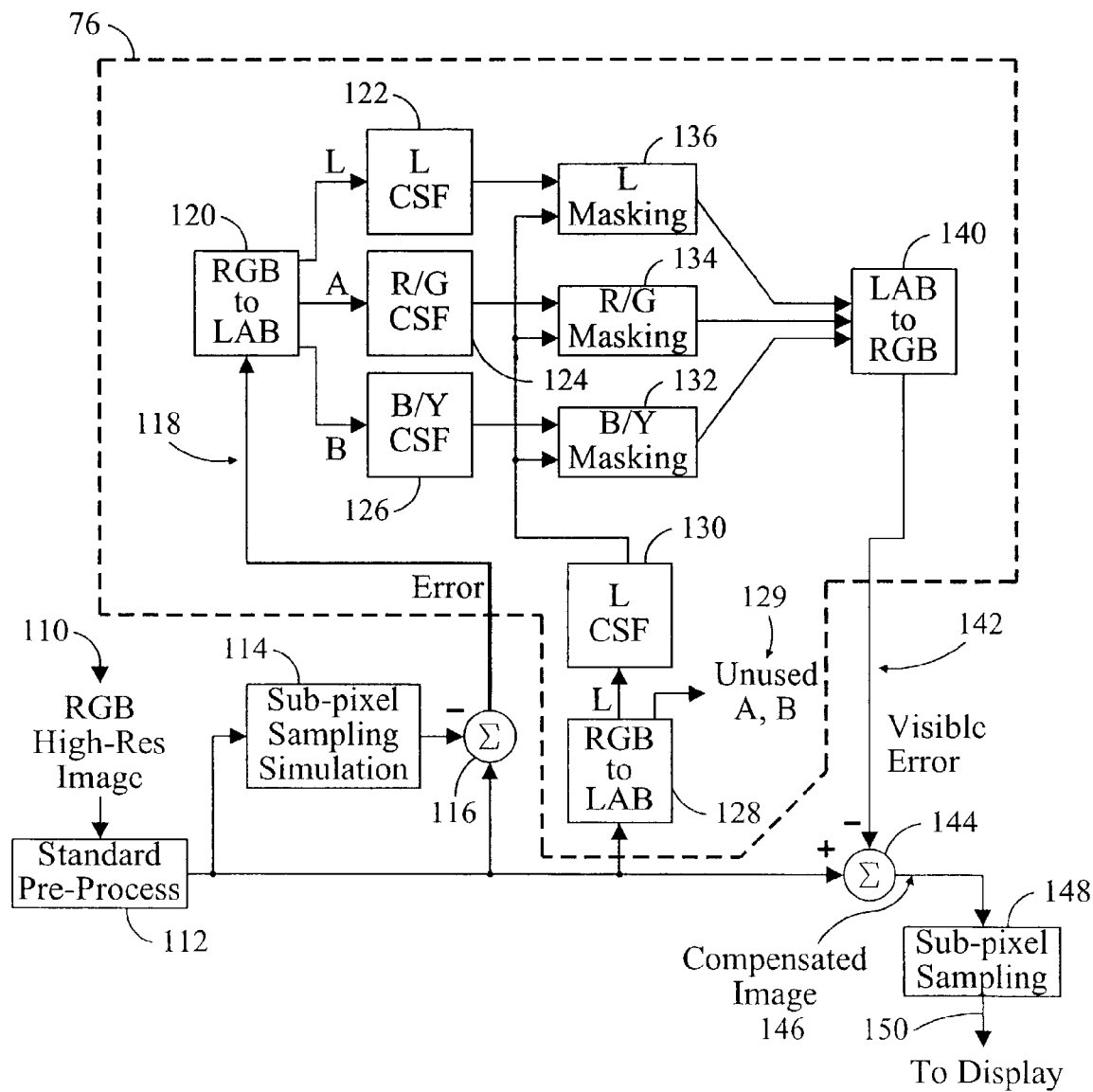
FIG. 11 is a block diagram of another embodiment of the present invention which employs a visual model utilizing masking of chroma by luminance.

In another embodiment, as illustrated in FIG. 11, edge effects or masking as well as frequency effects are treated. Generally, the image processing is performed on a high-resolution image such as RGB high-resolution image 110, if desired. Pre-processing 112 may be performed, if desired.

High-resolution image 110 is processed by a sub-pixel sampling simulation 114 which isolates the error introduced during sub-pixel sampling by performing the sampling simulation and converting the sampled image to its original resolution for comparison to the original, and subsequently primarily processed as previously described. Within the visual model 76, the error image, in a RGB or similar format is converted 120 to a LAB or similar format thereby segregating luminance data from chrominance data. After conversion to a luminance-enhanced format, such as LAB, the channels of luminance 122 and chrominance 124 and 126 are filtered.

After filtering 122, 124 and 126, the effects of masking, particularly the masking of chrominance by luminance, may be taken into account. The masking signal is preferably obtained from the source image 110 content rather than the error image. The source image 110 is converted 128 to a luminance-segregated format such as LAB from which the luminance data is extracted 130. In some embodiments, only the luminance channel 136 is masked. However chromatic channels 134 and 132 may also be masked, if desired. Masking is preferably performed as a pixel-wise comparison to account for edge effects. Masking is dependant on local contrast which is proportional to subtracting the mean of the entire L image from the L image then using the absolute value. A higher contrast signal level in L at a given position should result in more masking of the L, R/G, and B/Y signals at the same position. The masking is simulated by dividing these signals by the mask signal output from step 130, and then coring. Coring is a process by which a signal's value is changed to zero when the absolute value of the signal amplitude becomes less than a given threshold value.

Once masking has taken place, the LAB channels may be converted 140 back to the original image format, for example RGB. The resulting image represents the visible error 142 associated with sub-pixel sampling.

This resulting error image 142 is subsequently subtracted from the original high-resolution image 144 to create a compensated image 146 in which a correction is introduced which is substantially similar, but opposite to the error introduced during sub-pixel sampling. This compensated image 146, when sampled 148 results in a display image 150 which contains fewer errors than a directly sampled image without error correction. This is due to the reduction of the sampling errors by the visible error 142 introduced 144 before sampling 148.

The embodiment, as illustrated in FIG. 11, can only partially model the masking effect since the actual visual masking process primarily uses signals whose frequency content are mask frequency and whose spatial extent and position are similar. For images consisting solely of edges and lines, a 1/f-power spectra may be assumed. Thus at any given frequency and orientation, the signal content at higher frequencies with the same orientation will be less. Thus this approach generally overestimates masking, but since that will result in more error content in the error image, the net effect is that more chromatic aliasing is removed than necessary. This results in less luminance sharpness, but it will still be more than techniques that do not use masking aspects.

Figure 12:
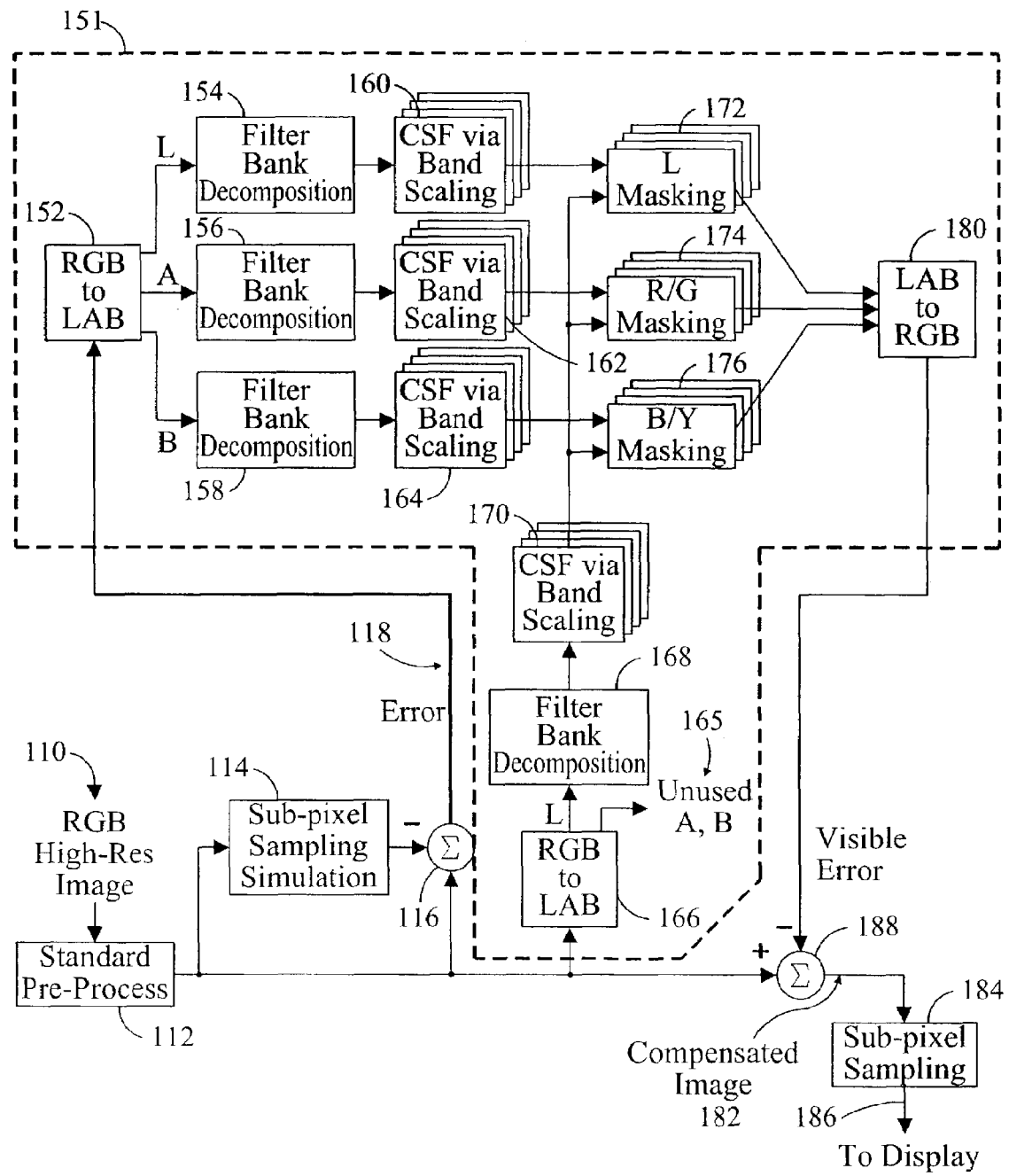
FIG. 12 is a block diagram of another embodiment of the present invention using a visual model which utilizes masking of chroma by luminance with a more accurate multi-channel, divided-frequency range visual model.

Referring to FIG. 12, another embodiment employs a more complete visual model 151 capable of predicting masking more accurately by the use of multiple frequency channels. Although only four channels are shown, their actual number may be greater or lesser, and they are typically both bandpass and limited in spatial orientation. Example channels are described in S. Daly (1993), "Visible Differences Predictor," Ch. 14 of *Digital Images and Human Vision*, ed. By A. B. Watson, MIT Press; and J. Lubin (1995), "A Visual Discrimination Model for Imaging System Design and Evaluation," Ch. 10 of *Vision Models for Target Detection and Recognition*, ed. by E. Peli, World Scientific Press; incorporated herein by reference.

A high-resolution image 110 may be optionally preprocessed 112 before sub-pixel sampling simulation 114. As in previously described embodiments, sub-pixel sampling simulation 114 is used to determine the error introduced by sub-pixel sampling. This error image may be isolated 116 from the simulation through direct comparison of the "post-processed" image to the original image 110 at the original image resolution. Generally, the lower resolution "post-processed" image is increased in resolution for comparative purposes. Once this error image 118 is obtained, the error image 118 may be processed in a visual model 151 of this embodiment.

As in other embodiments, the error image 118 is preferably converted from RGB or similar formats to a luminance-segregated format such as LAB 152. Using this type of format, the luminance and chrominance channels are further divided into frequency ranges using filter bank decomposition 154, 156 and 158. Each frequency range within each channel is then filtered using band scaling 160, 162 and 164.

Edge effects are also accounted for by converting the original source image to a luminance-segregated format such as LAB 166 followed by filter bank decomposition of the luminance channel 168 from the original image 110. Generally, the segregated chrominance channels 165 are not used in the masking process. Following filter bank decomposition 168, the frequency ranges are filtered via band scaling or similar procedures as performed for the main error image channels 160, 162 and 164. These signals created through luminance channel band scaling 170 may be used for masking the various luminance and chrominance channels 172, 174 and 176. The masking computation is similar to that described in conjunction with FIG. 11. However, in the computation of FIG. 12, the masking signal from a specific frequency band preferably only affects the corresponding frequency band of the error image.

Once masking has been completed for each frequency band of each channel, the resultant LAB signals may then be converted back to the original image format such as RGB 180. This RGB or similar file 180 represents the visible error introduced during sub-pixel sampling. The visible error 180 is subsequently subtracted (or otherwise) 188 from with the original high-resolution source file 110 thereby creating a compensated image 182.

The compensated image 182, when sampled 184 results in a display image which contains fewer errors than a directly sampled image without error correction. This is due to the reduction of the sampling errors by the visible error introduced before sampling. This embodiment uses a visual model with multi-channel capability that provides for masking of chroma by luminance.

Referring to FIG. 13, wherein a high-resolution grey scale image, such as RGB high-resolution image 170, is modified. Unlike some known methods, the process may be carried in domains other than the RGB domain. The YCrCb color domain may also be used, wherein the luminance components (Red-Green and Blue-Yellow) are separated. Other domains that are approximations to the visual systems opponent color channels are desirable. Examples include CIELAB, YUV, and Y R-Y B-Y. The chromatic components are subjected to modification that leads to attenuation of low chromatic frequencies in comparison to the high chromatic frequencies, eventually yielding a better sub-pixel sampled image that has fewer visible chromatic artifacts.

As FIG. 13 illustrates, the initial high-resolution image 170 in RGB format includes R 172, G 174 and B 176 data. These individual data sets may then be passed through low pass filters (LPF) 178, 180 and 182. This filtering essentially removes high frequency luminance and chromatic components that may alias in spite of the sub-pixel sub-sampling process. A bypass 171 of the RGB low-pass filtering steps may be used. Different filters may be used for different color layers. Generally some luminance information is allowed to exist which is greater than the displayed pixel Nyquist; that is, the luminance frequencies within the advantage region.

The filtered RGB image is then subjected to sub-pixel sub-sampling 186 that results in a 3× down sampled image while retaining horizontal luminance resolution beyond the down sampled pixel Nyquist frequency. Unfortunately, the sub-pixel sampling introduces chromatic artifacts, some of which may be visible as they occur at a sufficiently low spatial frequency. The goal is to reduce those occurring at frequencies low enough to be visible (i.e., falling within the chromatic CSF passband) while retaining the aforementioned horizontal luminance resolution. The RGB image is modified 188 into Y 190, Cb 192, and Cr 194 components. Other color domains and chromatic channels may also be used. In this particular embodiment, the Cb 192 and Cr 194 components are then high-pass filtered 196. When this filtering is performed, the low frequencies in Cb and Cr, that developed during sub-pixel sub-sampling, are removed by the high-pass filtering. High-pass filtering 196 generally is achieved through low-frequency attenuation rather than high-frequency enhancement. The filtered Cb and Cr components and the unfiltered Y component 190 are jointly converted 200 back to RGB to yield the final low-resolution image 202 that is ⅓ the original image's dimension with significantly reduced chromatic artifacts and significantly increased horizontal luminance resolution with ordinary sub-sampling.

Referring to FIG. 14, the retained signals relative to the luminance CSFs 210 and chromatic CSFs 212 are shown. The chromatic signals 214 are preserved in the high-pass region, which are undetectable to the eye. The HPF chromatic signal 214 is the chromatic aliasing that carries valid high resolution luminance information 216.

The high-pass filtering may be performed via an unsharp mask. The unsharp mask may use a low-pass kernel. Typically, the incoming signal is processed with the low-pass kernel yielding a low-pass version of the signal. This low-pass version (or an amplitude scaled version) is subsequently subtracted from incoming signal while preserving the signal's mean value resulting in a high pass image.

One embodiment may use high-pass filters which are equivalent to the compliment of the chromatic CSFs. These CSFs may be mapped from the domain of cy/deg (where they are modeled) to the digital domain of cy/pix. The actual mapping process takes into account the viewing distance, and allows for customization for different applications, having particular display resolutions in pixels/mm and different expected or intended viewing distances. Also, these filters may take into account the particular luminance-enhanced color space being used. As a result, chromatic artifacts will be reduced when viewed no closer than the designed viewing distance. However, the luminance resolution will be improved.

FIG. 15 shows the signals retained relative to the luminance CSF 430 and chromance CSF 432. The chromance signals preserved include the high-pass region 434 (result of a achromatic processing, see FIG. 16), which is undetectable to the visual system as well as the low-pass region 436 (result of chromatic processing, see FIG. 16), which contains the useful low pass chromatic content of the original image. The HPF chromatic signal 434 is the chromance aliasing that carries valid high resolution luminance information. FIG. 15 shows no overlap between these two chromatic signals, but depending on the actual filters used, overlap may exist. Other embodiments may include the use of filters that allow for overlap of the high-pass 434 and low-pass 436 chromatic signals shown in FIG. 15. Overlap can allow for more chromatic bandwidth at the expense of chromance aliasing.

Figure 16:
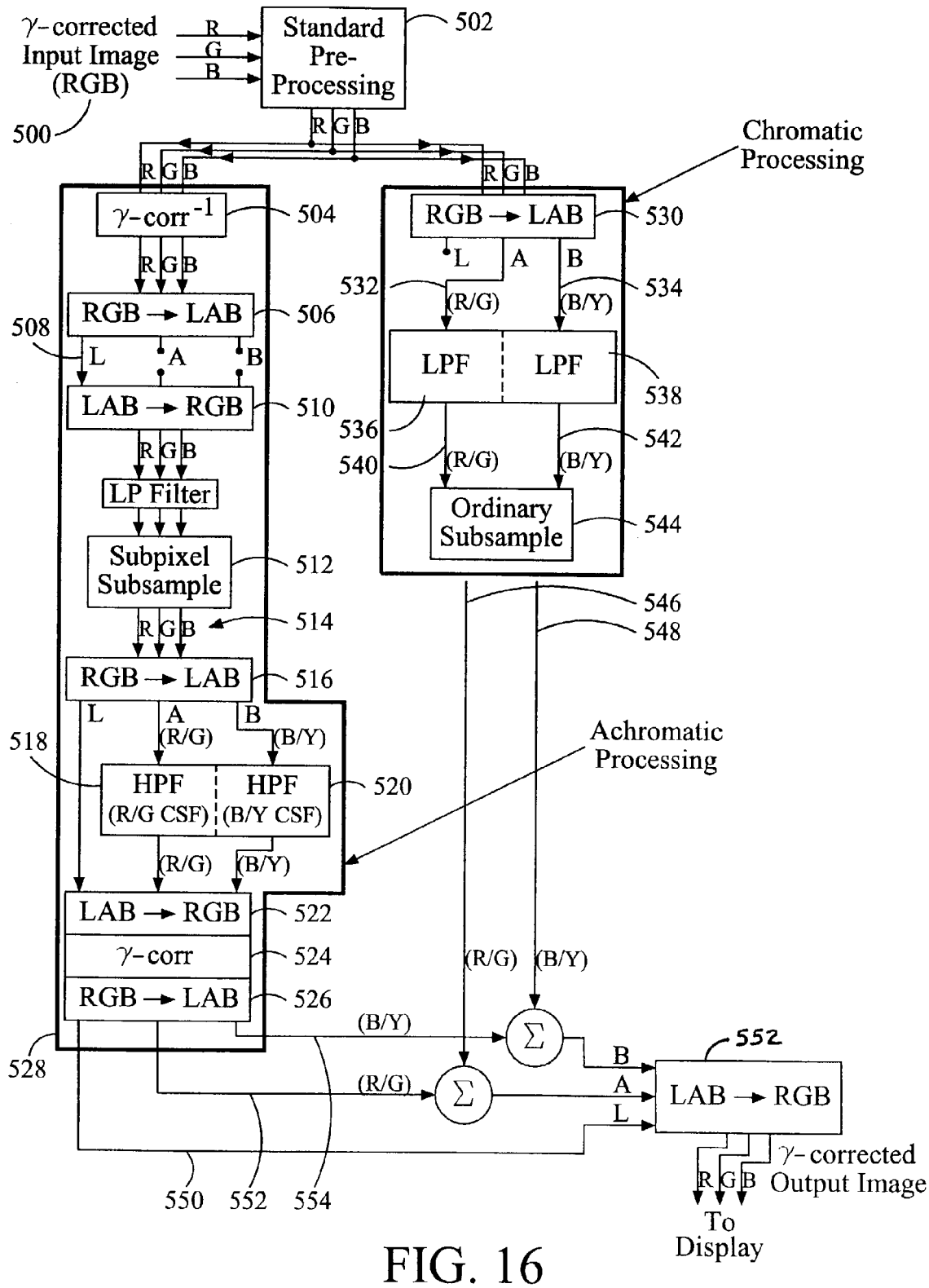
FIG. 16 is a block diagram of another embodiment.

Referring to FIG. 16, another processing technique, similar in nature to the other processing techniques is shown. An input image 500, such as a RBG image, may be pre-processed 502 using any suitable technique. The input image 500 may be a gamma corrected image, if desired. The gamma correction may be inverted 504, if desired. The gamma inverted image 504 is converted to a luminance enhanced color space 506, such as a LAB color space. The luminance channel 508 is then converted to a RGB color space 510. In effect, the conversion to RGB color space 510 creates an image that is composed of luminance information or otherwise all the values for the red, green, and blue components of the relevant pixels each have the same value, namely, that of the luminance value of the pixel. In other words, for each relevant pixel the RGB values of that pixel's sub-pixels are replaced by the corresponding luminance value.

Figure 1:
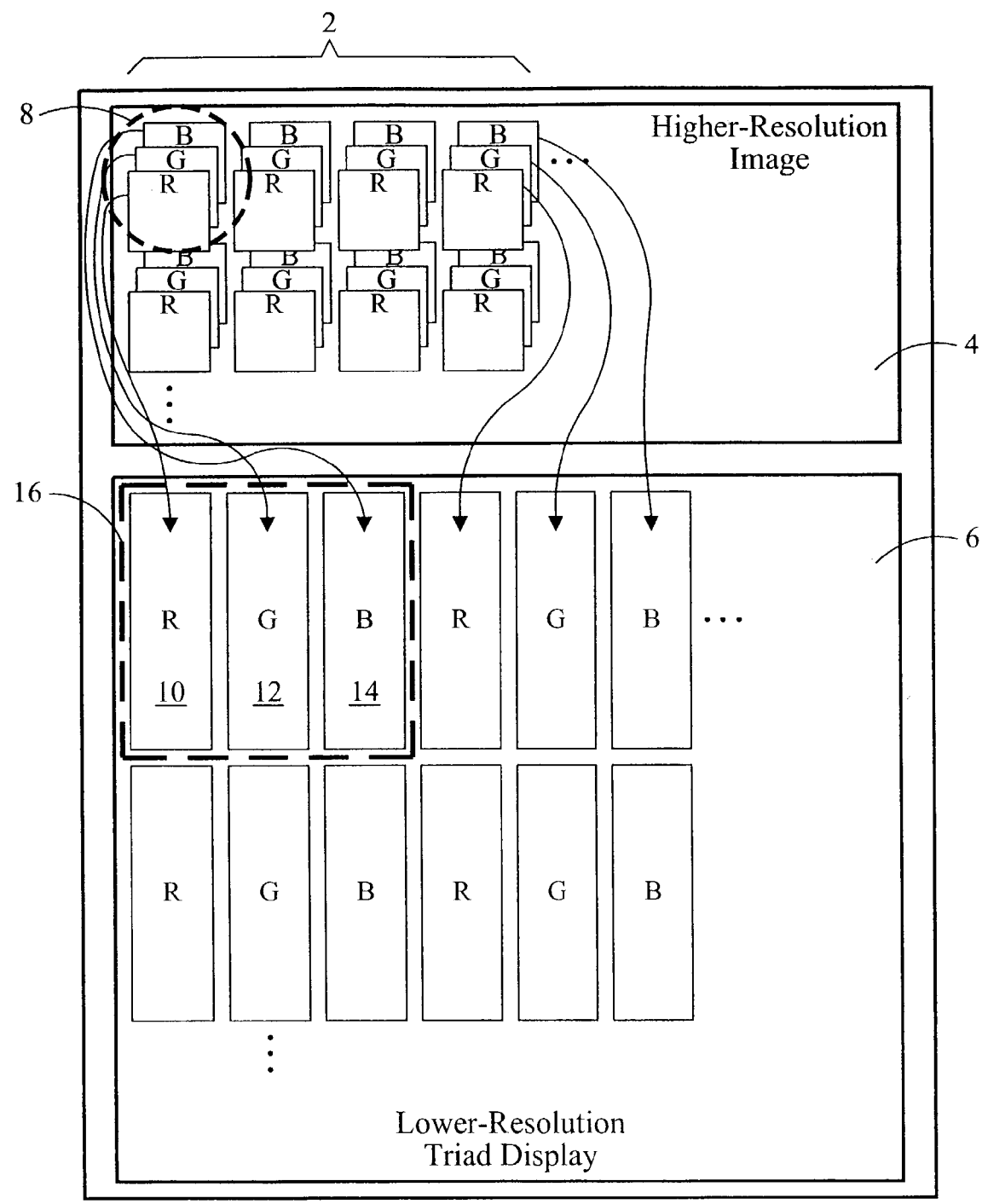
FIG. 1 is a diagram showing traditional image sampling for displays with a triad pixel configuration.
Figure 2:
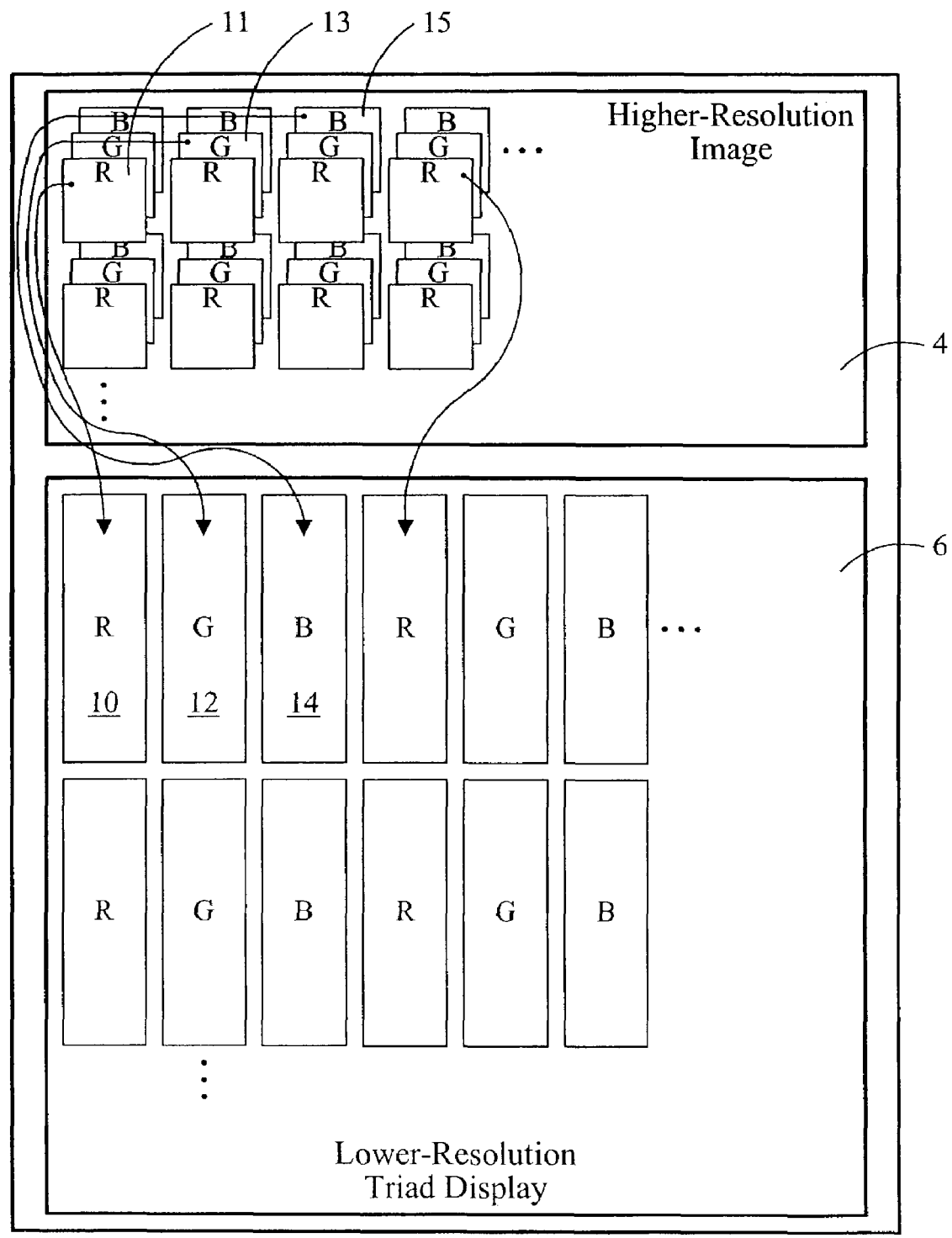
FIG. 2 is a diagram showing sub-pixel image sampling for a display with a triad pixel configuration.
Figure 3:
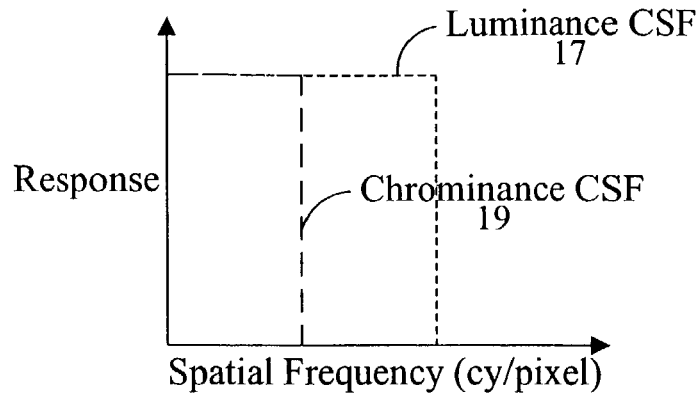
FIG. 3 is a graph showing idealized CSFs plotted on a digital frequency axis.
Figure 4:
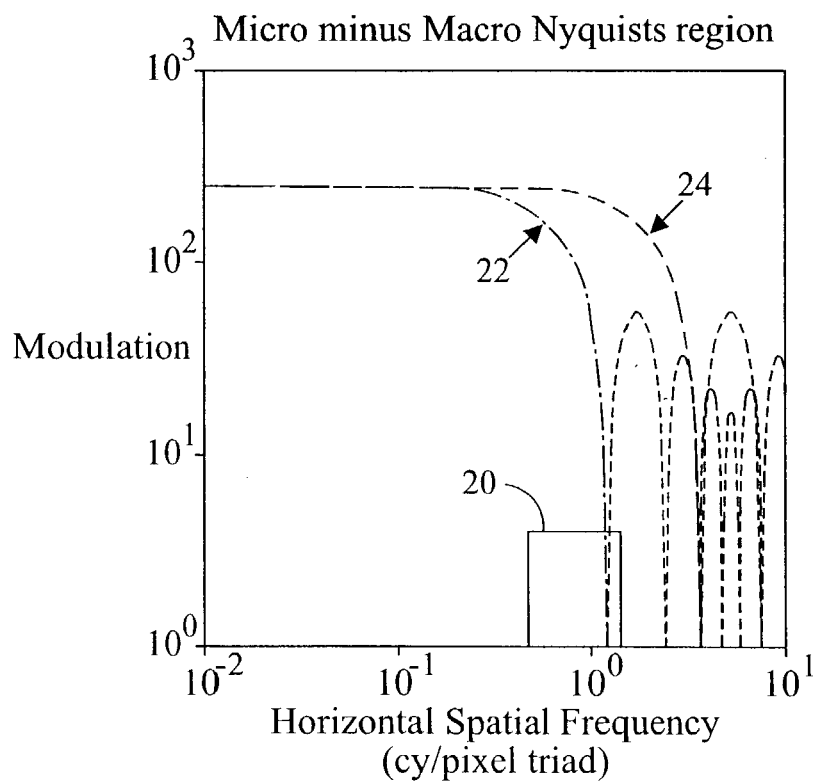
FIG. 4 is a graph showing an analysis of the pixel Nyquist and sub-pixel Nyquist regions which denotes the advantage region.
Figure 5:
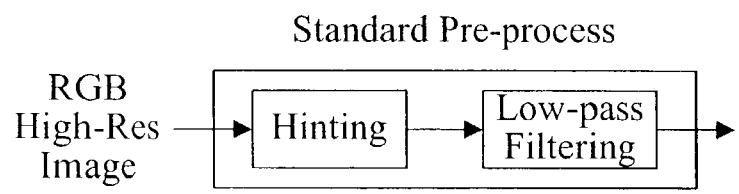
FIG. 5 shows typical pre-processing techniques.
Figure 6A:
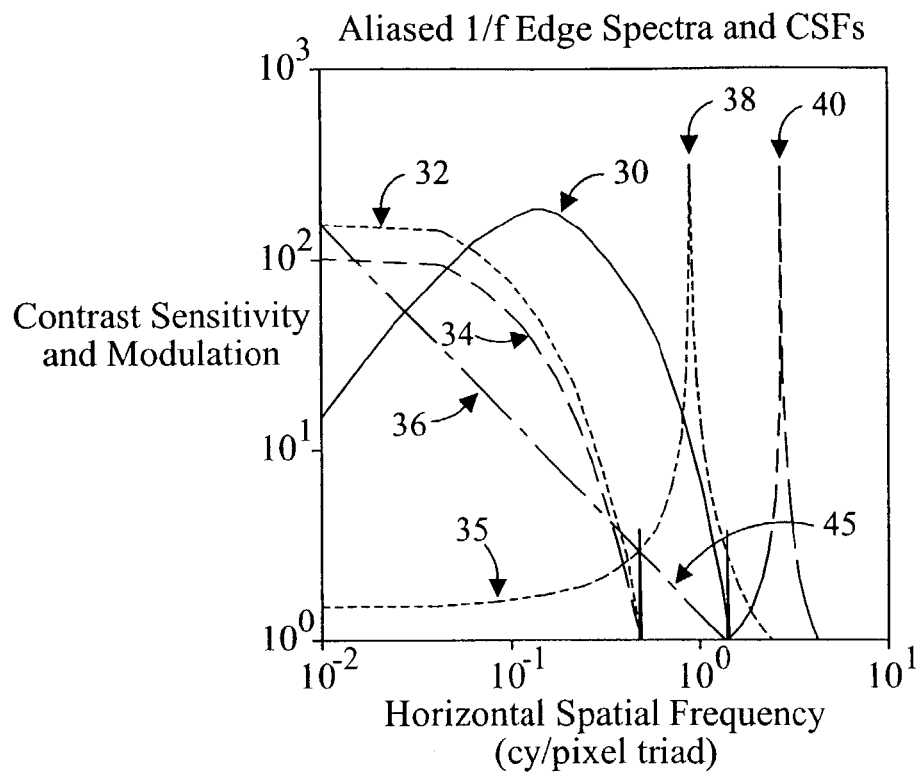
FIG. 6A is a graph showing an analysis using 1/f-power spectra repeated at pixel sampling and sub-pixel sampling frequencies.
Figure 6B:
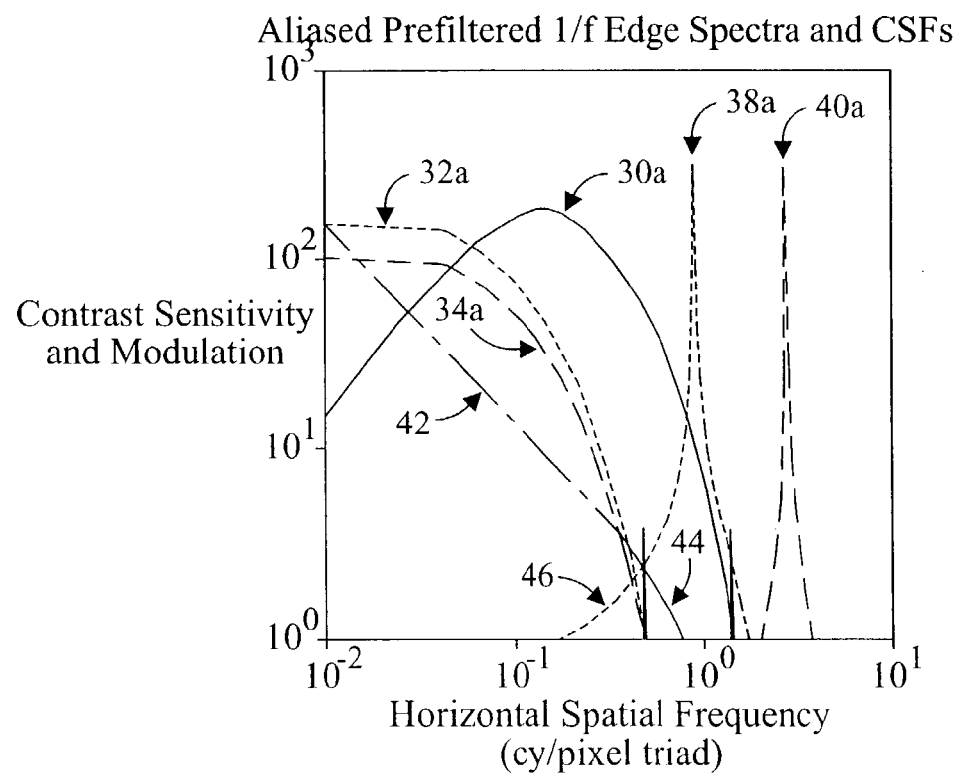
FIG. 6B is a graph showing an analysis using 1/f-power spectra repeated at pixel sampling and sub-pixel sampling frequencies with effects due to pre-processing.
Figure 7:
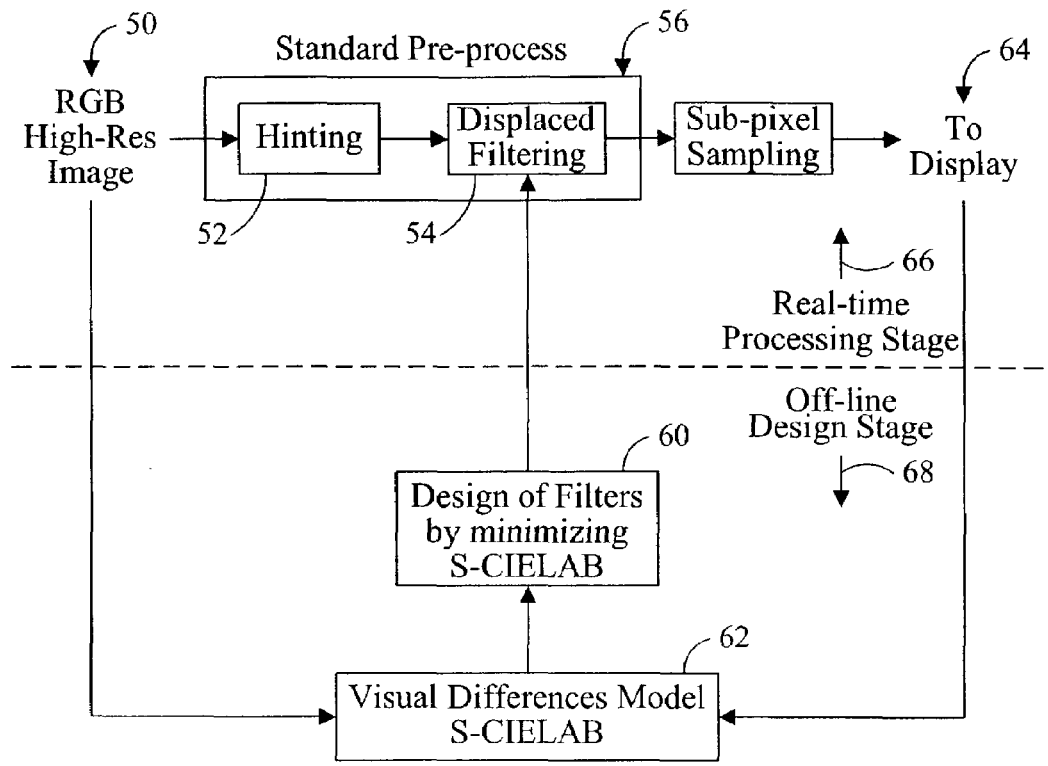
FIG. 7 is a block diagram showing a known use of a visual model.

The RGB image at the output of block 510 may be filtered in a suitable manner (such as a low-pass filter) and sub-pixel sub-sampled 512, such as shown in FIG. 2, for example. The result of sub-pixel sub-sampling 512 is a spatial displacement of the luminance information as illustrated in FIG. 2, which is the result of a 3:1 down sampling ratio, but other ratios may be used depending upon the sub-pixel sub-sampling process and the prefiltering. The sub-pixel sub-sampling process of the luminance information creates spurious color information because the different color fields alias differently. The RGB sub-sampled image 514 is converted to a luminance enhanced color space 516. The color information created as a result of the sub-pixel sub-sampling process 512 includes chromatic aliasing. The chromatic channels A and B are high pass filtered by filters 518 and 520, respectively. Filters 518 and 520 reduce the low frequency chromatic information (or with respect to high frequency chromatic information) resulting from the sub-sampling of the luminance information. The luminance channel and the chromatic A and B channels are converted to RGB space 522, gamma corrected 524, and converted to LAB color space 526. The primary result of the achromatic processing 528 is to sub-pixel sub-sample the luminance information to achieve high luminance bandwidth while reducing the resulting generally visible chromatic aliasing (lower chromatic frequencies) that results from the sub-pixel sub-sampling of the luminance information. The generally non-visible chromatic aliasing (higher chromatic frequencies) may be maintained because it carries with it high resolution luminance information that may be observed by the viewer. It is noted that the luminance CSF has a substantially higher cutoff frequency than the chromatic CSF.

In the case that the input image is a color image the original chromatic content may be processed in a separate manner, namely, the chromatic processing branch of FIG. 16. The pre-processed image 502 may be converted to a luminance enhanced color space 530, such as LAB. The color channels A 532 and B 534 may be filtered by a corresponding low pass filter 536 and 538 in order to reduce potential aliasing. The filtered color channels A 540 and B 542 are sub-sampled 544 in an ordinary manner. The ordinarily sub-sampled channels 546 and 548 generally include the chromatic information for the image.

The luminance channel 550 generally includes the luminance information for the image at a bandwidth commensurate with the pixel sampling rate. The high frequency chromatic channels 552 and 554 that are aliased contain high resolution luminance data. These may be added to the color channels A 546 and B 548 (or otherwise combined in some manner) which contain the sub-sampled chromance from the original image. The result of these operations is a color display with luminance resolution that exceeds that normally associated with the pixel sampling rate. The resulting image is converted from LAB to RGB color space.

Figure 17:
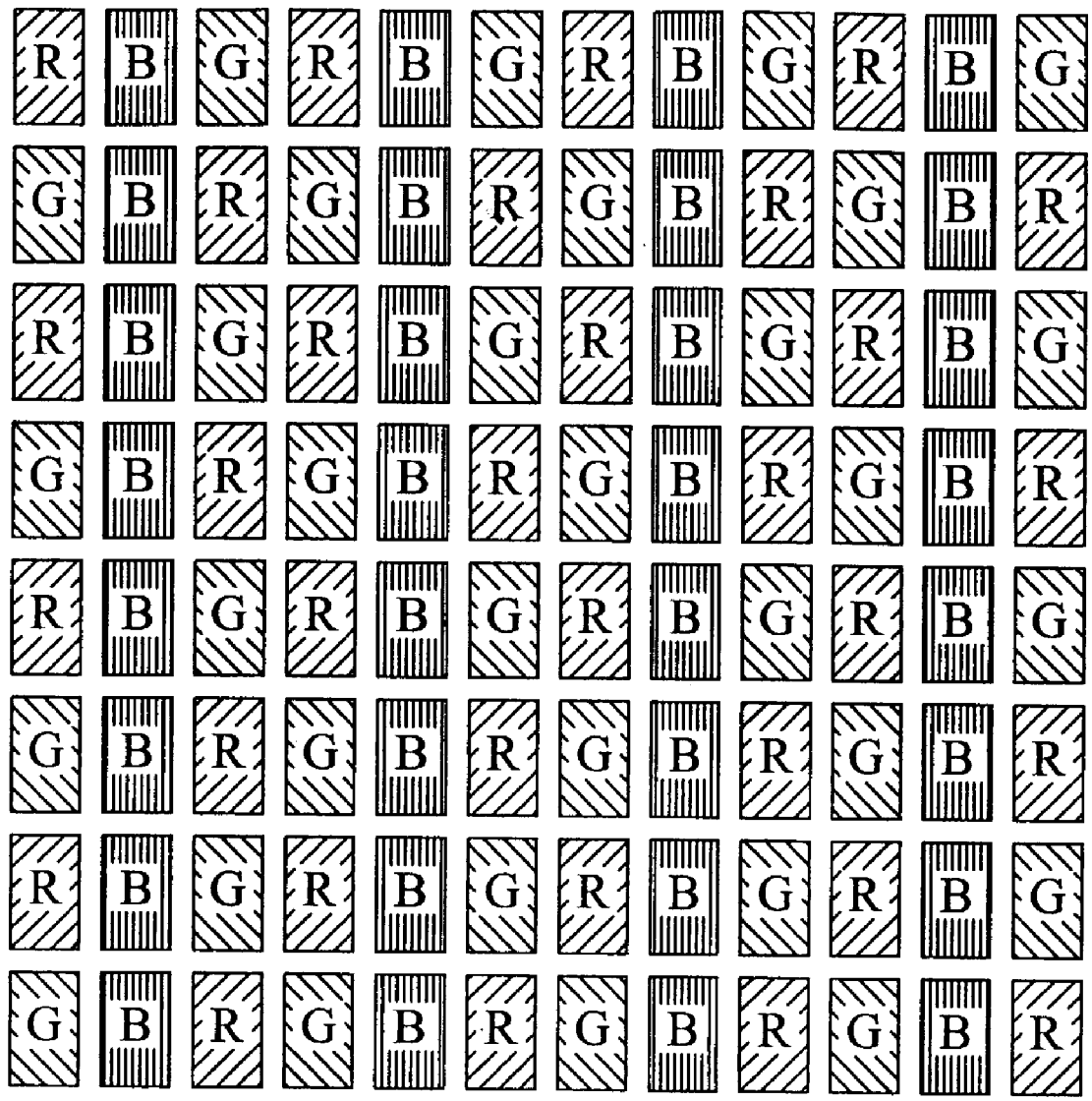
FIG. 17 illustrates a sub-pixel sampling geometry.
Figure 18:
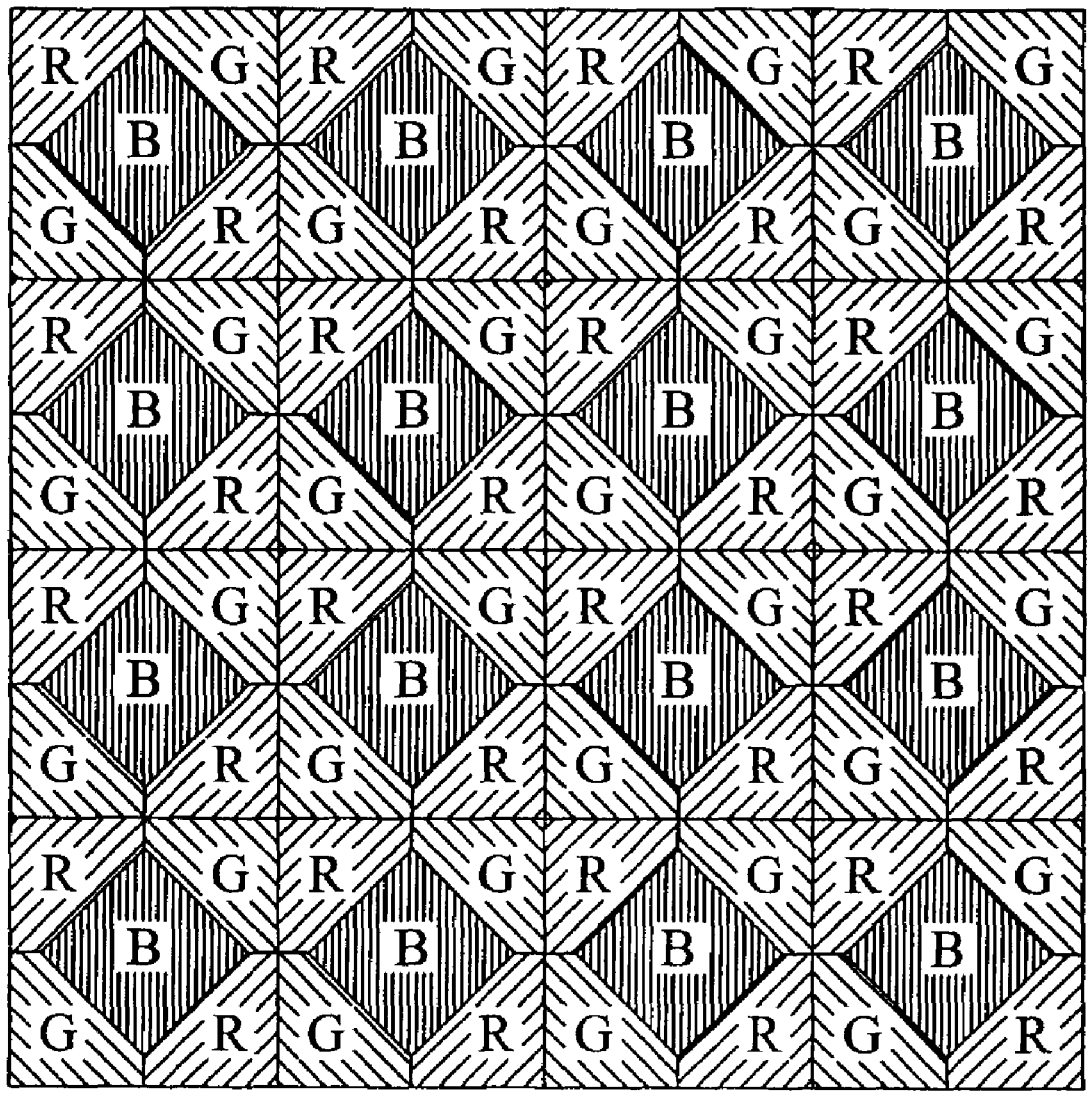
FIG. 18 illustrates another sub-pixel sampling geometry.

It is to be understood that any sub-pixel arrangement may likewise by used, such as those illustrated in FIGS. 17 and 18. The techniques described herein are applicable to horizontal one-dimensional filtering, vertical one-dimensional filtering, or two-dimensional filtering. In addition the filtering in 1D or 2D may be performed on an axis that is not aligned with the pixels or sub-pixels. Further, any post processing that may be desired may be performed prior to re-sampling. Furthermore, the chromatic aliasing may be reduced by using a suitable matrix of pre-filters in a manner similar to Betrisey, et al. Furthermore, the sub-pixel sub-sampling may be replaced with an ordinary sub-sampling operation and the phase shift(s) of the color planes incorporated into the pre-filters.

In the case of typical R, G, B sub-pixels, many designers tend to ignore the luminance contribution of B because it is typically less than 15%. In this case designers tend to primarily use R and G contributions in the algorithm design. However, the present inventors came to the realization that the resulting luminance pattern has non-uniform samples, namely, red luminance, green luminance, no luminance, etc. The existing systems fail to take into account this non-uniformity of the display. Moreover, the pattern shown in FIG. 18 has non-uniform luminance samples due to the red and blue sub-pixels, this is because the centroids of the sub-pixels are off center. To achieve improved re-sampling, especially in the case that the luminance and chromatic aspects are sampled differently, the processing may take into account the non-uniform sampling in a manner that reduces artifacts, such as chromatic artifacts, to less than it would have been had the non-uniform sampling not been considered.

What is claimed is:

1. A method for re-sampling an image having at least three color channels having chromatic information and luminance information comprising the steps of:
    (a) re-sampling said luminance information using a first re-sampling process and attenuating at least a portion of lower frequency chromatic information with respect to at least a portion of higher frequency chromatic information resulting from said re-sampling of said luminance information;
    (b) re-sampling said chromatic information of said image using a second re-sampling process, at least one of:
        (i) re-sampling of said luminance information is different than said re-sampling of said chromatic information; and
        (ii) said second process processes pixels of said image in a manner different than said first process;
    (c) combining said re-sampled luminance information, said re-sampled chromatic information, and at least a portion of said higher frequency chromatic information into a re-sampled image.

2. The method of claim 1 wherein said re-sampling of said luminance includes re-sampling.

3. The method of claim 1 wherein said attenuating is using a high pass filter.

4. The method of claim 1 wherein said re-sampling of said luminance information results in two chromatic channels, where each of said chromatic channels is attenuated in a different manner.

5. The method of claim 1 wherein said re-sampling of said luminance information is in accordance with a model based upon the human visual system.

6. The method of claim 1 wherein said re-sampling of said chromatic information includes re-sampling.

7. The method of claim 1 wherein said re-sampling of said luminance information of said image is performed in such a manner that chromatic aliasing is reduced from what it would have been had said re-sampling of said luminance information been re-sampled in the same manner as said re-sampling of said chromatic information.

8. The method of claim 1 wherein said re-sampling of said luminance information is performed on a luminance portion of said image free from substantial re-sampling of chromatic information of said image, while said re-sampling of said chromatic information is performed on a chromatic portion of said image free from substantial re-sampling of luminance information of said image.

9. A method for re-sampling an image having at least three color channels comprising the steps of:
    (a) re-sampling luminance information of said image, wherein said luminance information is at least 60% of the luminance of said image; and
    (b) attenuating at least a portion of lower frequency chromatic information with respect to at least a portion of higher frequency chromatic information resulting from said re-sampling of said luminance information.

10. The method of claim 9 wherein said re-sampling of said luminance includes pixel re-sampling.

11. The method of claim 9 wherein said attenuating is using a high pass filter.

12. The method of claim 9 wherein said re-sampling of said luminance information results in two chromatic channels, where each of said chromatic channels is attenuated in a different manner.

13. A method for re-sampling an image comprising a plurality of at least three channels, wherein a first one of said channels has a luminance component comprising at least 60% of the luminance of said image, wherein at least one of a second and third one of said channels has a color component;
    (a) re-sampling said first channel of said image;
    (b) attenuating at least a portion of lower frequency chromatic information with respect to at least a portion of higher frequency chromatic information resulting from said re-sampling of said first channel of said image; and
    (c) re-sampling said second channel of said image.

14. The method of claim 13 wherein said luminance component comprises at least 70% of the luminance of said image.

15. The method of claim 13 wherein said luminance component comprises at least 80% of the luminance of said image.

16. The method of claim 13 wherein said luminance component comprises at least 90% of the luminance of said image.

17. The method of claim 13 wherein said plurality of channels are color difference channels.

18. A method for re-sampling an image having at least three color channels having chromatic information and luminance information comprising the steps of:
    (a) re-sampling said luminance information using a first re-sampling process;
    (b) re-sampling said chromatic information of said image using a second re-sampling process, at least one of:
        (i) re-sampling of said luminance information is different than said re-sampling of said chromatic information; and (ii) said second process processes pixels of said image in a manner different than said first process;

(c) attenuating at least a portion of lower frequency chromatic information with respect to at least a portion of higher frequency chromatic information that results from said re-sampling of said luminance information;

(d) combining said re-sampled luminance information, said re-sampled chromatic information, and at least a portion of said higher frequency chromatic information into a re-sampled image.

19. The method of claim 18 wherein said re-sampling of said luminance information is performed prior to said re-sampling of said chromatic information.

20. The method of claim 18 wherein said attenuating is using a high pass filter.

21. The method of claim 18 wherein said re-sampling of said luminance information results in two chromatic channels, where each of said chromatic channels is attenuated in a different manner.

22. The method of claim 18 wherein said re-sampling of said chromatic information includes pixel re-sampling.

23. The method of claim 18 wherein said re-sampling of said luminance information of said image is performed in such a manner that chromatic aliasing is reduced from what it would have been had said re-sampling of said luminance information been re-sampled in the same manner as said re-sampling of said chromatic information.

24. The method of claim 18 wherein said re-sampling of said luminance information is performed on a luminance portion of said image free from substantial re-sampling of chromatic information of said image, while said re-sampling of said chromatic information is performed on a chromatic portion of said image free from substantial re-sampling of luminance information of said image.

25. A method for re-sampling an image having at least three color channels comprising the steps of:

(a) re-sampling said image in a manner that the luminous information has a non-uniform sampling rate;

(b) filtering said re-sampled image in a manner that takes into account said non-uniform sampling rate in such a manner that reduces the chromatic artifacts of said image to less than it would have been had said non-uniform sampling been taken into account.

26. The method of claim 25 wherein said image has a luminance non-uniform sampling rate in the horizontal direction.

27. The method of claim 25 wherein said image has a luminance non-uniform sampling rate in the vertical direction.

28. The method of claim 25 wherein said image has a luminance non-uniform sampling rate in a diagonal direction.

29. The method of claim 25 wherein said filtering include a high pass filter of chromatic information.

* * * * *

UNITED STATES PATENT AND TRADEMARK OFFICE
CERTIFICATE OF CORRECTION

PATENT NO. : 7,110,012 B2 Page 1 of 1
APPLICATION NO. : 10/447186
DATED : September 19, 2006
INVENTOR(S) : Dean Messing et al.

It is certified that error appears in the above-identified patent and that said Letters Patent is hereby corrected as shown below:

Column 3, Line 5 - change "ID" to "1D"
Column 11, Line 51 - change "chromance" to --chrominance-- (both instances on line 51)
Column 11, Line 57 - change "chromance" to --chrominance--
Column 11, Line 65 - change "chromance" to --chrominance--
Column 12, Line 1 - change "RBG" to --RGB--
Column 12, Line 66 - change "chromance" to --chrominance--
Column 16, Line 26 - change "include" to --includes--

Signed and Sealed this

Thirteenth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,110,012 B2 Page 1 of 1
APPLICATION NO. : 10/447186
DATED : September 19, 2006
INVENTOR(S) : Dean Messing et al.

It is certified that error appears in the above-identified patent and that said Letters Patent is hereby corrected as shown below:

Column 3, Line 5 - change "ID" to --1D--
Column 11, Line 51 - change "chromance" to --chrominance" (both instances on line 51)
Column 11, Line 57 - change "chromance" to --chrominance--
Column 11, Line 65 - change "chromance" to --chrominance--
Column 12, Line 1 - change "RBG" to --RGB--
Column 12, Line 66 - change "chromance" to --chrominance--
Column 16, Line 26 - change "include" to --includes--

Signed and Sealed this

Eleventh Day of December, 2007

JON W. DUDAS
*Director of the United States Patent and Trademark Office*